(12) United States Patent
Shin et al.

(10) Patent No.: US 12,172,510 B2
(45) Date of Patent: Dec. 24, 2024

(54) HIGH VOLTAGE BATTERY MOUNTING STRUCTURE FOR A VEHICLE

(71) Applicants: HYUNDAI MOTOR COMPANY, Seoul (KR); KIA CORPORATION, Seoul (KR)

(72) Inventors: Gyung Hoon Shin, Seoul (KR); Yong Hwan Choi, Seoul (KR); Yu Ri Oh, Hwaseong-si (KR); Wu Hyun Kim, Goyang-si (KR); Hae Kyu Lim, Bucheon-si (KR); Ji Woong Jung, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 407 days.

(21) Appl. No.: 17/707,208

(22) Filed: Mar. 29, 2022

(65) Prior Publication Data

US 2022/0219523 A1     Jul. 14, 2022

Related U.S. Application Data

(63) Continuation-in-part of application No. 17/157,177, filed on Jan. 25, 2021, now Pat. No. 11,824,217.

(30) Foreign Application Priority Data

Aug. 3, 2020   (KR) .................. 10-2020-0096848
Jun. 17, 2021   (KR) .................. 10-2021-0078964

(51) Int. Cl.
*B60K 1/04*      (2019.01)
*H01M 50/242*     (2021.01)
*H01M 50/244*     (2021.01)

(52) U.S. Cl.
CPC .............. *B60K 1/04* (2013.01); *H01M 50/242* (2021.01); *H01M 50/244* (2021.01); *B60K 2001/0438* (2013.01)

(58) Field of Classification Search
CPC ............. B60K 1/04; B60K 2001/0438; H01M 50/242; H01M 50/244
See application file for complete search history.

(56) References Cited

U.S. PATENT DOCUMENTS

RE44,994 E    7/2014   Rawlinson et al.
8,980,458 B2   3/2015   Honjo et al.
(Continued)

FOREIGN PATENT DOCUMENTS

JP     4801947 B2    8/2011
JP     5605470 B2    9/2014
(Continued)

OTHER PUBLICATIONS

Office Action mailed Feb. 8, 2023 cited in corresponding U.S. Appl. No. 17/157,177; 14 pp.
(Continued)

*Primary Examiner* — Jason D Shanske
*Assistant Examiner* — James J Triggs
(74) *Attorney, Agent, or Firm* — Lempia Summerfield Katz LLC (57) ABSTRACT

Disclosed is a high voltage battery mounting structure for a vehicle. In particular, the high voltage battery mounting structure includes: a battery case located below a vehicle body panel, a first engagement member fixed to the vehicle body panel, a second engagement member configured to pass through the battery case from a lower side to be coupled to the vehicle body panel by the medium of the first engagement member, and a third engagement member in which a hollow through which the second engagement
(Continued)

member passes is provided and which is installed to support between an upper cover of the battery case and the vehicle body panel.

11 Claims, 5 Drawing Sheets

(56) References Cited

U.S. PATENT DOCUMENTS

| | | | |
|---|---|---|---|
| 10,494,034 B2* | 12/2019 | Makowski | H01M 50/249 |
| 10,581,133 B2 | 3/2020 | Santoniccolo | |
| 10,661,647 B2* | 5/2020 | Hofer | H01M 50/147 |
| 11,034,227 B2 | 6/2021 | Spielvogel et al. | |
| 11,038,236 B2 | 6/2021 | Montgomery | |
| 11,142,058 B2 | 10/2021 | Marquez Duran et al. | |
| 11,155,150 B2 | 10/2021 | Stephens et al. | |
| 11,462,793 B2 | 10/2022 | Kagami et al. | |
| 11,511,612 B2* | 11/2022 | Jeon | B62D 25/20 |
| 11,539,231 B1* | 12/2022 | Sahoo | H02M 7/219 |
| 2011/0143179 A1 | 6/2011 | Nakamori | |
| 2012/0156539 A1 | 6/2012 | Honjo et al. | |
| 2014/0302279 A1* | 10/2014 | Pfaffelhuber | B32B 3/266 156/196 |
| 2016/0272246 A1* | 9/2016 | Berger | H01M 50/24 |
| 2020/0180417 A1 | 6/2020 | Marquez Duran et al. | |
| 2020/0350522 A1 | 11/2020 | Choi et al. | |
| 2022/0037731 A1 | 2/2022 | Jung et al. | |
| 2022/0144060 A1 | 5/2022 | Shin et al. | |
| 2022/0219523 A1 | 7/2022 | Shin et al. | |

FOREIGN PATENT DOCUMENTS

| | | |
|---|---|---|
| KR | 20140045778 A | 4/2014 |
| KR | 101655482 B1 | 9/2016 |
| KR | 20200037237 A | 4/2020 |
| KR | 20220063505 A | 5/2022 |

OTHER PUBLICATIONS

Office Action mailed May 23, 2024 cited in corresponding U.S. Appl. No. 17/744,341; 13 pp.

* cited by examiner

HIGH VOLTAGE BATTERY MOUNTING STRUCTURE FOR A VEHICLE

CROSS REFERENCE TO RELATED APPLICATION

This application is a continuation-in-part of non-provisional U.S. patent application Ser. No. 17/157,177, filed on Jan. 25, 2021, which claims priority to and the benefit of Korean Patent Application Nos. 10-2020-0096848, filed on Aug. 3, 2020 and 10-2021-0078964, filed on Jun. 17, 2021, the entire contents of each of which are incorporated herein by reference.

FIELD

The present disclosure relates to a structure for mounting a high voltage battery, which is used in an electric vehicle or the like, in a vehicle.

BACKGROUND

The statements in this section merely provide background information related to the present disclosure and may not constitute prior art.

It is desired that a high voltage battery mounted on an electric vehicle has as high an energy storage capacity as possible and the high voltage battery is mainly mounted by securing a considerable space below a floor between a front wheel and a rear wheel.

As described above, the high voltage battery mounted below the floor of the vehicle should be installed to secure safety against impacts applied from the outside of a lower side of the vehicle.

The foregoing is intended merely to aid in the understanding of the background of the present disclosure, and is not intended to mean that the present disclosure falls within the purview of the related art that is already known to those having ordinary skill in the art.

SUMMARY

The present disclosure provides a high voltage battery mounting structure for a vehicle, which allows a high voltage battery to be firmly and safely mounted on a lower side of a floor of a vehicle to prevent the high voltage battery from being damaged and broken, thereby securing safety of the high voltage battery and eventually sufficiently securing durability of an electric vehicle.

According to one aspect, there is provided a high voltage battery mounting structure for a vehicle, which includes a battery case located below a vehicle body panel, a first engagement member fixed to the vehicle body panel, a second engagement member configured to pass through the battery case from a lower side to be coupled to the vehicle body panel by the medium of the first engagement member, and a third engagement member in which a hollow through which the second engagement member passes is provided and which is installed to support between an upper cover of the battery case and the vehicle body panel.

The first engagement member may include a flange coupled to the vehicle body panel, and a thread portion in which the second engagement member is screw-coupled to a central portion of the flange.

The flange of the first engagement member may be coupled to an upper surface of the vehicle body panel, and the thread portion may pass through the vehicle body panel downward.

The flange of the first engagement member may be coupled to a lower surface of the vehicle body panel, and the thread portion may protrude from the flange toward the battery case on the lower side.

A mounting pipe may be provided inside the battery case to support between an upper portion and a lower portion of the battery case and allow the second engagement member to pass through the mounting pipe inward.

An upper end of the mounting pipe may support a lower surface of the upper cover of the battery case and may be coupled to the third engagement member.

A lower extension of the third engagement member may be coupled to the mounting pipe through a through-hole of the upper cover of the battery case, and a diameter of the hollow may be formed to be greater than an outer diameter of a shank part of the second engagement member and formed to be smaller than an inner diameter of the through-hole.

A screw thread may be provided on an outer side of the lower extension of the third engagement member to be screw-coupled to the mounting pipe.

A preliminary engagement portion, which is made of a screw thread capable of being coupled to an engagement element engaged from an upper side of the vehicle body panel, may be provided in an inner diameter portion of the third engagement member.

A mid plate configured to support a lower side of an accommodated battery module may be provided inside the battery case, and a mounting support, through which the second engagement member passes and which is formed to connect a lower side of the mid plate to a lower end of the mounting pipe, may be provided inside the battery case.

The mounting support may include a depression which is upwardly recessed to accommodate the head portion of the second engagement member, and the lower end of the mounting pipe may be supported on an upper portion of the depression of the mounting support.

Further areas of applicability should become apparent from the description provided herein. It should be understood that the description and specific examples are intended for purposes of illustration only and are not intended to limit the scope of the present disclosure.

BRIEF DESCRIPTION OF THE DRAWINGS

The above and other objects, features and other advantages of the present disclosure should be more clearly understood from the following detailed description when taken in conjunction with the accompanying drawings, in which.

The drawings described herein are for illustration purposes only and are not intended to limit the scope of the present disclosure in any way.

DETAILED DESCRIPTION

Specific structural and functional descriptions of the embodiments of the present disclosure disclosed in this disclosure or application are illustrative only for the purpose of describing the embodiments, and the embodiments according to the present disclosure may be implemented in various forms and should not be construed as being limited to embodiments described in this disclosure or application.

The embodiments according to the present disclosure may be variously modified and may have various forms, so that specific embodiments are illustrated in the drawings and described in detail in this disclosure or application. It should be understood, however, that it is not intended to limit the embodiments according to the concept of the present disclosure to specific disclosure forms, but it includes all modifications, equivalents, and alternatives falling within the spirit and scope of the present disclosure.

The terms first, second, and/or the like may be used to describe various components, but the components should not be limited by these terms. These terms may be used only for the purpose of distinguishing one component from another component, and, for example, a first component may be referred to as a second element, and similarly, the second component may also be referred to as the first component without departing from the scope of the present disclosure.

When a component is referred to as being "connected," or "coupled" to another component, it may be directly connected or coupled to another component, but it should be understood that yet another component may exist between the component and another component. On the contrary, when a component is referred to as being "directly connected" or "directly coupled" to another, it should be understood that still another component may not be present between the component and another component. Other expressions describing the relationship between components, that is, "between" and "immediately between," or "adjacent to" and "directly adjacent to" should also be construed as described above.

Terms used herein is used only for the purpose of describing specific embodiments, and are not intended to limit the present disclosure. Unless the context clearly dictates otherwise, the singular form includes the plural form. In this disclosure, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Unless defined otherwise, all terms including technical or scientific terms used herein have the same meaning as commonly understood by those skill in the art to which the present disclosure pertains. General terms that are defined in a dictionary shall be construed to have meanings that are consistent in the context of the relevant art, and should not be interpreted as having an idealistic or excessively formalistic meaning unless clearly defined in this disclosure.

Hereinafter, exemplary embodiments of the present disclosure are described in detail with reference to the accompanying drawings. Like reference numerals denote like members throughout the drawings.

Referring to FIGS. 1 to 4, a high voltage battery mounting structure for a vehicle of the present disclosure is a structure in which a battery case 1 is mounted below a vehicle body 3.

In one form of the present disclosure, the high voltage battery mounting structure includes the battery case 1 located below a vehicle body panel 5, a first engagement member 7 fixed to the vehicle body panel 5, a second engagement member 9 passing through the battery case 1 from a lower side to be coupled to the vehicle body panel 5 by the medium of the first engagement member 7, and a third engagement member 15 in which a hollow 11 through which the second engagement member 9 passes is provided and which is installed to support between an upper cover 13 of the battery case 1 and the vehicle body panel 5.

The battery case 1 is a component including a case frame 19 provided to surround the battery module 17, the upper cover 13 configured to finish an upper side of the case frame 19, a mid plate 21 installed to finish a lower side of the case frame 19 to support a lower side of the battery module 17, and a shield plate 25 installed on a lower side of the mid plate 21 with a cooling panel 23 interposed therebetween.

The cooling panel 23 is configured to form a refrigerant flow path together with the mid plate 21 and allows the battery module 17 to be cooled through a flow of a refrigerant.

That is, in the high voltage battery mounting structure of the present disclosure, the second engagement member 9 passes through the battery case 1, which is configured as described above, from the lower side thereof to be engaged with the first engagement member 7 so that the battery case 1 is firmly coupled to the vehicle body 3 and the third engagement member 15 is installed between the upper cover 13 of the battery case 1 and the vehicle body panel 5 to support a compressive force between the first engagement member 7 and the second engagement member 9.

Therefore, a plurality of battery modules 17 are accommodated inside the battery case 1 in a stable state to prevent damage and breakage so that safety of the high voltage battery is secured and thus, eventually, durability of the electric vehicle can be sufficiently secured.

The first engagement member 7 is a component including a flange 27 coupled to the vehicle body panel 5, and a thread portion 29 in which the second engagement member 9 is screw-coupled to a central portion of the flange 27.

Figure 1:
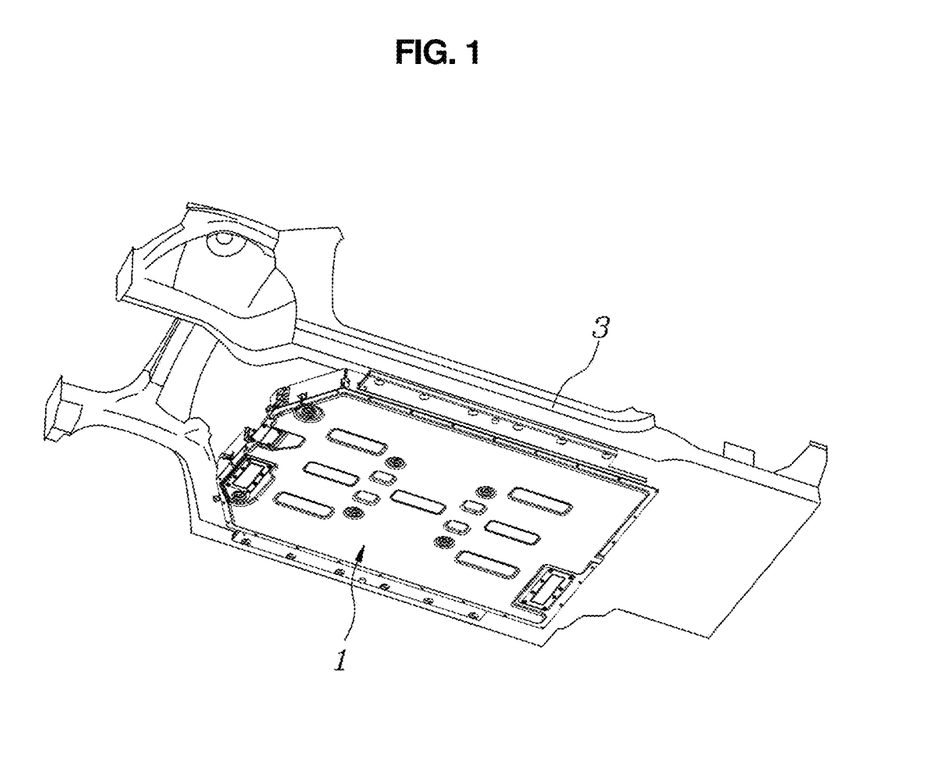
FIG. 1 is a diagram for describing a structure in which a high voltage battery is mounted on a vehicle according to one embodiment of the present disclosure.
Figure 2:
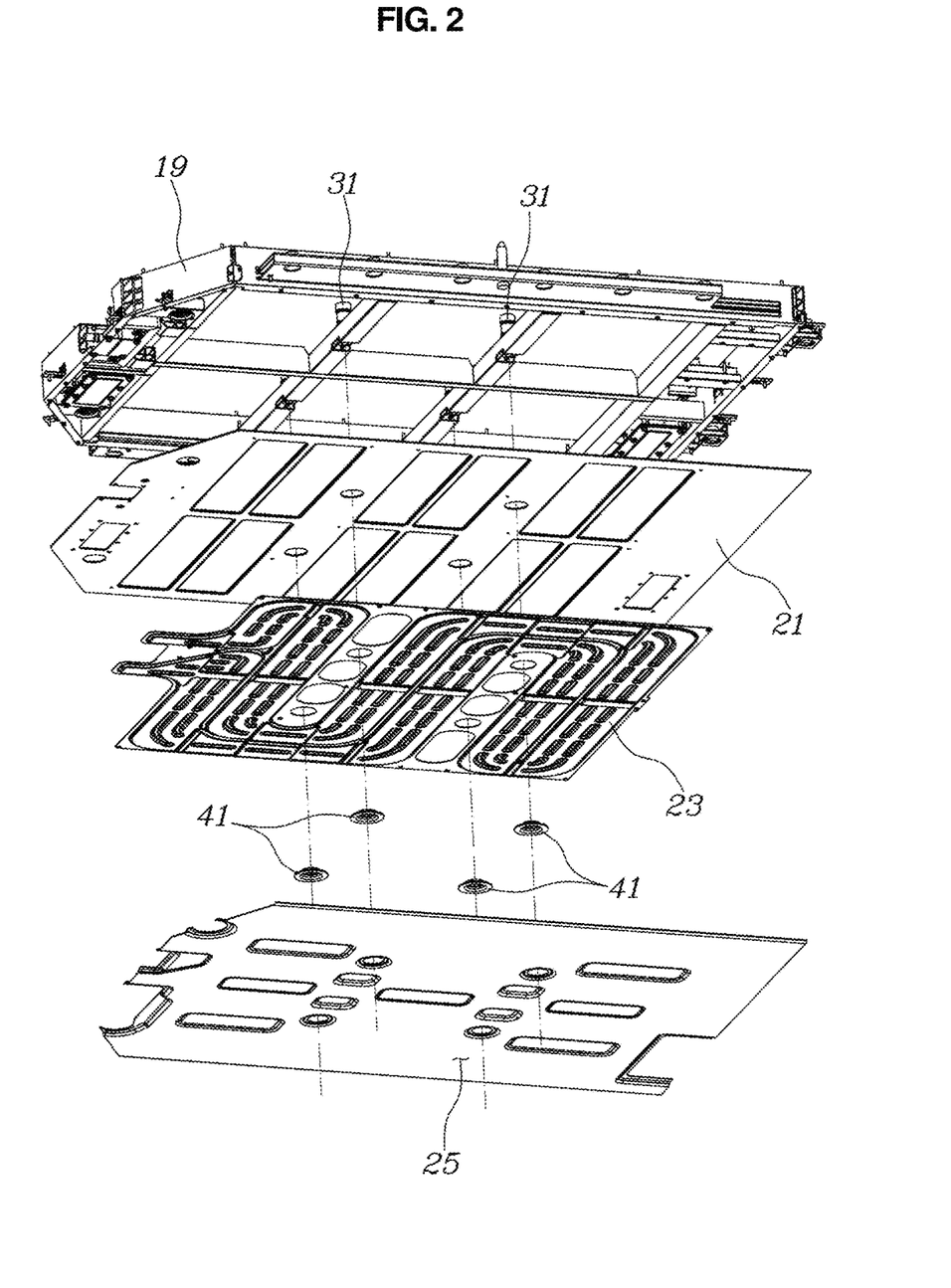
FIG. 2 is an exploded diagram illustrating a battery case of FIG. 1.
Figure 3:
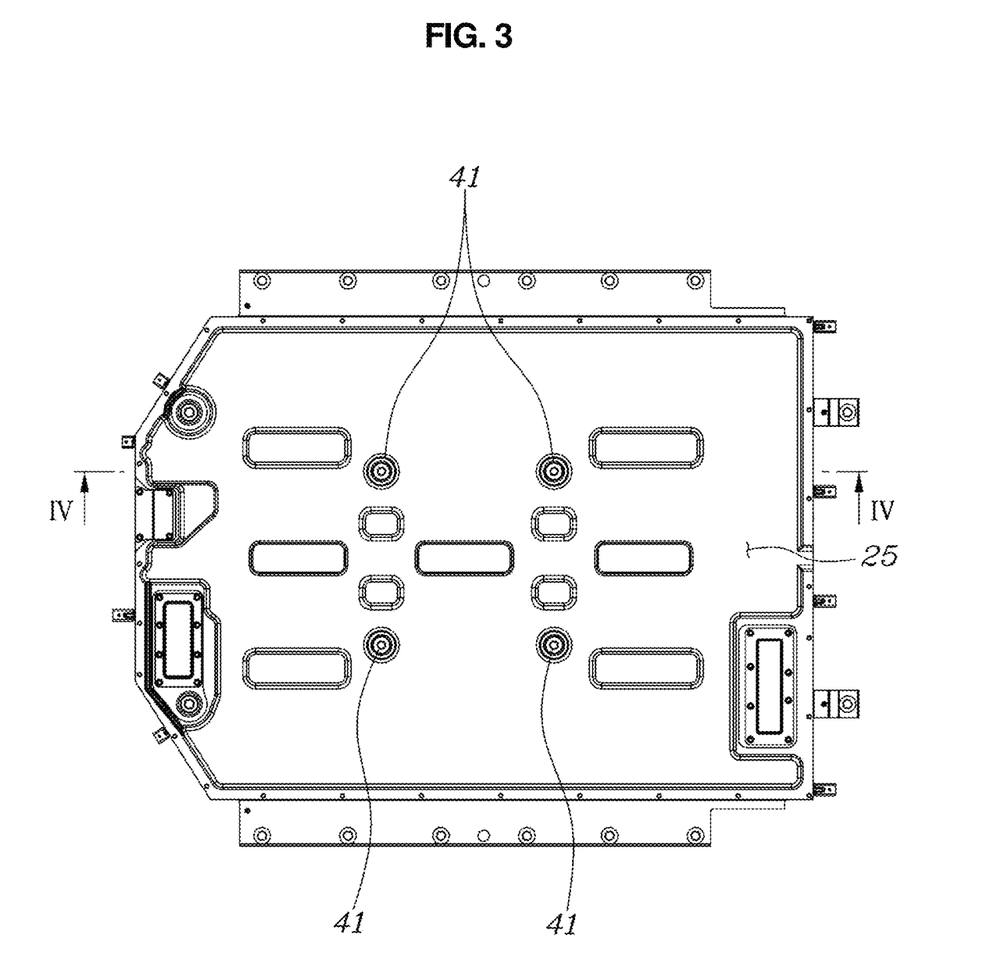
FIG. 3 is a lower side view illustrating the battery case of FIG. 1.
Figure 4:
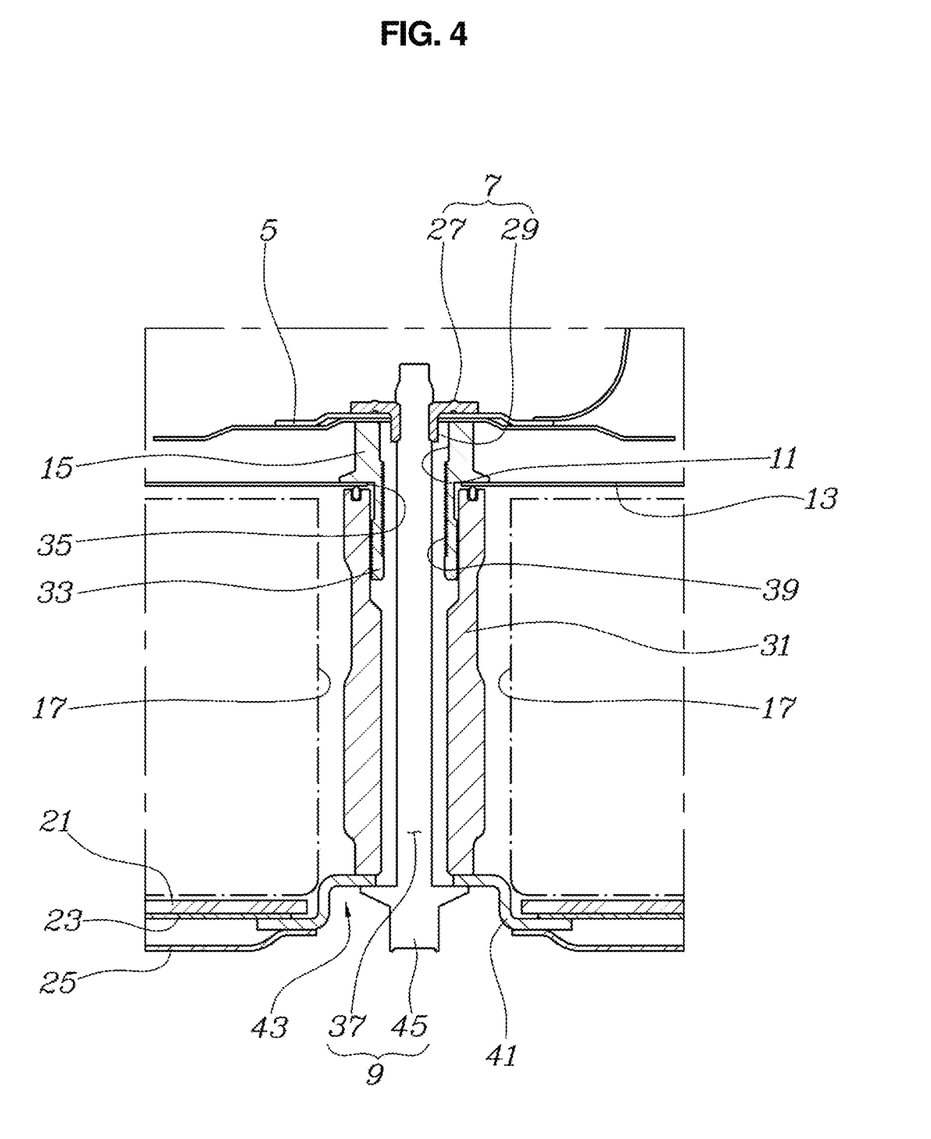
FIG. 4 is a cross-sectional view taken along line IV-IV of FIG. 2.

In the embodiment shown in FIG. 4, the flange 27 of the first engagement member 7 is a component coupled to an upper surface of the vehicle body panel 5, and the thread portion 29 is a component passing through the vehicle body panel 5 downward.

Figure 5:
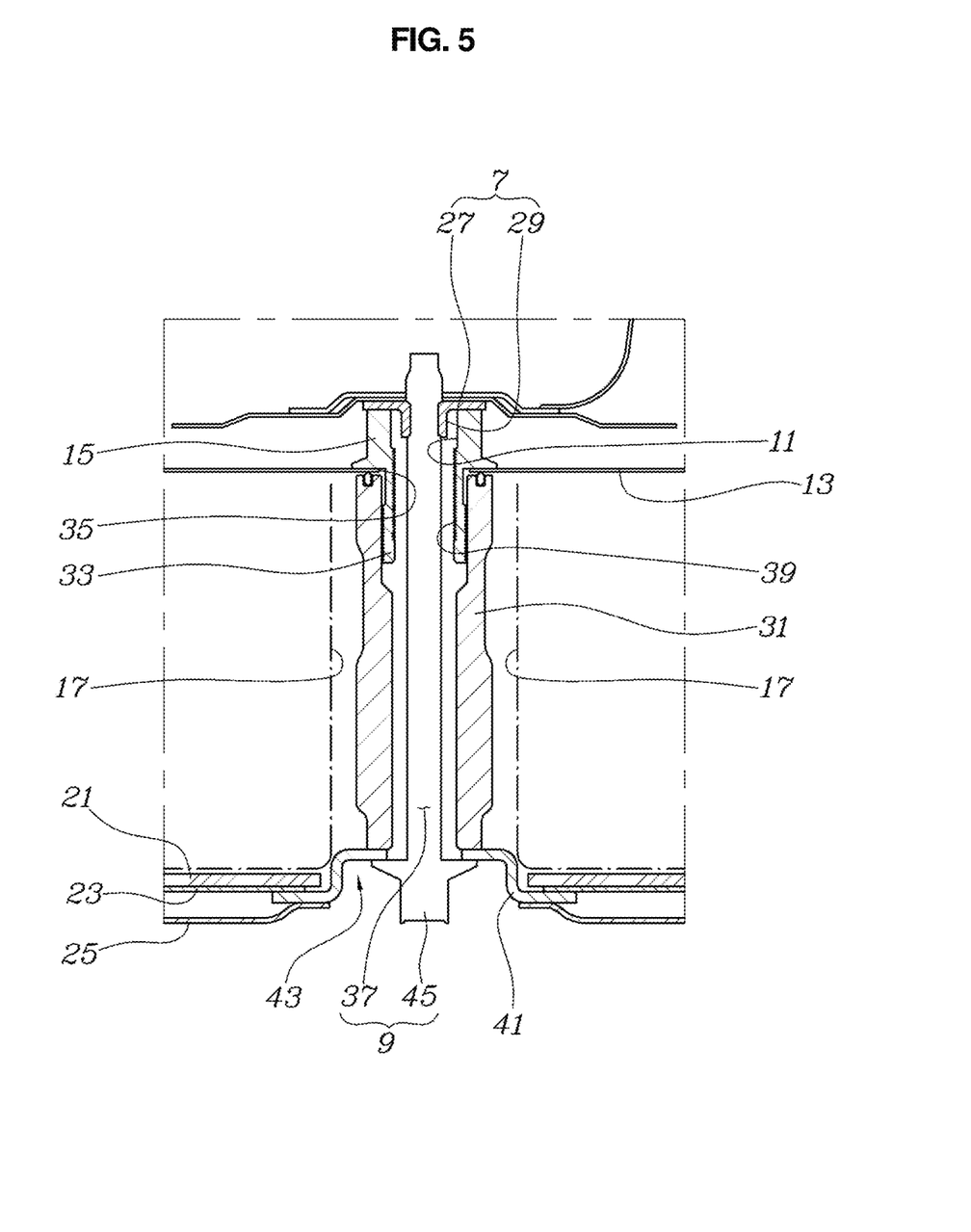
FIG. 5 is a cross-sectional view illustrating a high voltage battery mounting structure for a vehicle according to another embodiment of the present disclosure.

Unlike the embodiment shown in FIG. 4, in another embodiment shown in FIG. 5, the flange 27 of the first engagement member 7 is a component coupled to a lower surface of the vehicle body panel 5, and the thread portion 29 is a component protruding from the flange 27 toward the battery case 1 on the lower side.

The flange 27 of the first engagement member 7 may be coupled to the vehicle body panel 5 by welding or the like to be integrated with the vehicle body 3.

A mounting pipe 31 is provided inside the battery case 1 to support between an upper portion and a lower portion of the battery case 1 and allow the second engagement member 9 to pass through the mounting pipe 31.

The mounting pipe 31 is a component of which an upper end supports a lower surface of the upper cover 13 of the battery case 1 and which is coupled the third engagement member 15.

In the present embodiment, a screw thread is provided on an outer side of a lower extension 33 of the third engagement member 15 and is screw-coupled to the mounting pipe 31.

Thus, the mounting pipe 31 serves to firmly support the compressive force acting between the first engagement member 7 and the second engagement member 9 while forming a firm engagement state with the third engagement member 15. Accordingly, the mounting pipe 31 serves to allow the battery case 1 to continuously and stably maintain a firm coupling state with the vehicle body 3 and serves to stably support a space in which the battery module 17 is accommodated.

In the third engagement member 15, the lower extension 33 is coupled to the mounting pipe 31 through a through-hole 35 of the upper cover 13 of the battery case 1, and a diameter of the hollow 11 is formed to be greater an outer diameter of a shank part 37 of the second engagement member 9 and formed to be smaller than an inner diameter of the through-hole 35.

Thus, while firmly supporting the compressive force acting between the first engagement member 7 and the second engagement member 9 together with the mounting pipe 31, the third engagement member 15 allows the second engagement member 9 to pass through the hollow 11 inward without interference.

Meanwhile, a preliminary engagement portion 39 made of a screw thread capable of being coupled to an engagement element engaged from an upper side of the vehicle body panel 5 may be provided in an inner diameter portion of the third engagement member 15.

For example, the preliminary engagement portion 39 may be preliminarily provided to allow a separate engagement member, which is inserted to pass through the vehicle body panel 5 from the vehicle body 3, to be coupled to form a coupling structure not by the first engagement member 7 and the second engagement member 9, thereby being easily dedicated to a high voltage battery mounting structure using a different manner.

A mounting support 41, through which the second engagement member 9 passes and which is formed to connect a lower side of the mid plate 21 to a lower end of the mounting pipe 31, is provided on a lower side of the battery case 1.

In the present embodiment, the mounting support 41 has structure which includes a depression 43 recessed upward to accommodate a head portion 45 of the second engagement member 9 and in which the lower end of the mounting pipe 31 is supported on an upper side of the depression 43 of the mounting support 41.

Accordingly, a pressure acting upward due to the head portion 45 of the second engagement member 9 is transmitted to the mounting pipe 31 through the mounting support 41, and the mounting support 41 forms a firm support structure for supporting the lower side of the mid plate 21.

In accordance with the present disclosure, there is provided a high voltage battery mounting structure for a vehicle, which allows a high voltage battery to be firmly and safely mounted on a lower side of a floor of a vehicle to prevent the high voltage battery from being damaged and broken, thereby securing safety of the high voltage battery and eventually sufficiently securing durability of an electric vehicle.

Although specific embodiments of the present disclosure have been described and illustrated, those having ordinary skill in the art should appreciate that various alternations and modifications are possible without departing from the technical spirit of the present disclosure.

What is claimed is:

1. A high voltage battery mounting structure for a vehicle, the high voltage battery mounting structure comprising:
   a battery case located below a vehicle body panel;
   a first engagement member fixed to the vehicle body panel;
   a second engagement member configured to pass through the battery case from a lower side to be coupled to the vehicle body panel by a medium of the first engagement member; and
   a third engagement member in which a hollow through which the second engagement member passes is provided and which is installed to provide support between an upper cover of the battery case and the vehicle body panel.

2. The high voltage battery mounting structure of claim 1, wherein the first engagement member includes a flange coupled to the vehicle body panel, and a thread portion in which the second engagement member is screw-coupled to a central portion of the flange.

3. The high voltage battery mounting structure of claim 2, wherein:
   the flange of the first engagement member is coupled to an upper surface of the vehicle body panel; and
   the thread portion passes through the vehicle body panel downward.

4. The high voltage battery mounting structure of claim 2, wherein:
   the flange of the first engagement member is coupled to a lower surface of the vehicle body panel; and
   the thread portion protrudes from the flange toward the battery case on the lower side.

5. The high voltage battery mounting structure of claim 1, wherein a mounting pipe is provided inside the battery case to support between an upper portion and a lower portion of the battery case and allow the second engagement member to pass through the mounting pipe inward.

6. The high voltage battery mounting structure of claim 5, wherein an upper end of the mounting pipe supports a lower surface of the upper cover of the battery case and is coupled to the third engagement member.

7. The high voltage battery mounting structure of claim 6, wherein:
   a lower extension of the third engagement member is coupled to the mounting pipe through a through-hole of the upper cover of the battery case; and
   a diameter of the hollow is formed to be greater than an outer diameter of a shank part of the second engagement member and formed to be smaller than an inner diameter of the through-hole.

8. The high voltage battery mounting structure of claim 7, wherein a screw thread is provided on an outer side of the lower extension of the third engagement member to be screw-coupled to the mounting pipe.

9. The high voltage battery mounting structure of claim 7, wherein a preliminary engagement portion, which is made of a screw thread configured to be coupled to an engagement element engaged from an upper side of the vehicle body panel, is provided in an inner diameter portion of the third engagement member.

10. The high voltage battery mounting structure of claim 6, wherein:
    a mid plate configured to support a lower side of an accommodated a battery module is provided inside the battery case; and
    a mounting support, through which the second engagement member passes and which is formed to connect a lower side of the mid plate to a lower end of the mounting pipe, is provided inside the battery case.

11. The high voltage battery mounting structure of claim 10, wherein:

the mounting support includes a depression which is upwardly recessed to accommodate a head portion of the second engagement member; and the lower end of the mounting pipe is supported on an upper portion of the depression of the mounting support.

\* \* \* \* \*

UNITED STATES PATENT AND TRADEMARK OFFICE
CERTIFICATE OF CORRECTION

PATENT NO. : 12,172,510 B2
APPLICATION NO. : 17/707208
DATED : December 24, 2024
INVENTOR(S) : Gyung Hoon Shin et al.

Page 1 of 1

It is certified that error appears in the above-identified patent and that said Letters Patent is hereby corrected as shown below:

In the Claims

Column 6, Claim 10:
Lines 59-60, please delete "an accommodated"

Signed and Sealed this
Eleventh Day of February, 2025

Coke Morgan Stewart
*Acting Director of the United States Patent and Trademark Office*